(12) United States Patent
Post

(10) Patent No.: US 10,447,110 B2
(45) Date of Patent: Oct. 15, 2019

(54) HALBACH-ARRAY RADIAL STABILIZER FOR A PASSIVE MAGNETIC BEARING

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 249 days.

(21) Appl. No.: 15/170,864

(22) Filed: Jun. 1, 2016

(65) Prior Publication Data
US 2017/0353078 A1 Dec. 7, 2017

(51) Int. Cl.
*H02K 7/09* (2006.01)
*H02K 11/26* (2016.01)
*F16C 32/04* (2006.01)

(52) U.S. Cl.
CPC ............ *H02K 7/09* (2013.01); *F16C 32/041* (2013.01); *F16C 32/0436* (2013.01); *H02K 11/26* (2016.01)

(58) Field of Classification Search
CPC ....................................................... H02K 7/09
USPC ...................................................... 310/90.5
IPC ....................................................... H02K 7/09
See application file for complete search history.

(56) References Cited

U.S. PATENT DOCUMENTS

| 3,572,854 | A | * | 3/1971 | Danby | F16C 32/0408 |
| | | | | | 310/90.5 |
| 5,847,480 | A | | 12/1998 | Post | |
| 2003/0042816 | A1 | * | 3/2003 | Post | F16C 32/0436 |
| | | | | | 310/191 |
| 2008/0265704 | A1 | * | 10/2008 | Buhler | F16C 32/0457 |
| | | | | | 310/90.5 |
| 2012/0175985 | A1 | * | 7/2012 | Post | F16C 32/0436 |
| | | | | | 310/90.5 |
| 2015/0318751 | A1 | * | 11/2015 | Smith | H02K 21/24 |
| | | | | | 310/71 |

FOREIGN PATENT DOCUMENTS

| CN | 201910679 U | 7/2011 |
| CN | 105119454 A | 12/2015 |
| WO | 2015-148719 A1 | 10/2015 |

OTHER PUBLICATIONS

International Search Report and Written Opinion for PCT/US2017/033191 corresponding to U.S. Appl. No. 15/170,864, 15 pages.
Post, "Stability Issues in Ambient-Temperature Passive Magnetic Bearing Systems," US Department of Energy, Lawrence Livermore National Laboratory, 2000, 19 pps.

* cited by examiner

*Primary Examiner* — Thomas Truong
(74) *Attorney, Agent, or Firm* — John P. Wooldridge

(57) ABSTRACT

A radial stabilizer is provided for stabilizing levitation passive bearing elements against lateral displacements. The stabilizer provides a means to introduce anisotropy in the radial stiffness of the stabilizer. The presence of anisotropic stiffness has a strongly stabilizing effect on whirl-type rotor-dynamic instabilities. The stabilizer design also provides a means for continuously monitoring the state of health of the rotor by signaling the onset of changes of balance that would be expected to precede any major failure.

12 Claims, 4 Drawing Sheets

HALBACH-ARRAY RADIAL STABILIZER FOR A PASSIVE MAGNETIC BEARING

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to passive magnetic bearings, and more specifically, it relates to means for radial stabilization of such bearings.

Description of Related Art

An improved radial stabilizer is desirable for stabilizing levitation passive bearing elements against lateral displacements. A means for overcoming whirl type instabilities would be especially beneficial. It is also desirable that the stabilizer design includes a means for continuously monitoring the state of health of the rotor by signaling the onset of changes of balance that would be expected to precede any major failure.

SUMMARY OF THE INVENTION

The invention is directed to a radial stabilizer for a passive magnetic bearing. An example radial stabilizer is described in U.S. Pat. No. 5,847,480, "Passive Magnetic Bearing Element with Minimal Power Losses" by the present inventor. The present invention involves the subdivision of the stator windings of the stabilizer into four quadrant windings. Geometrically opposite pairs of these quadrant windings are then connected in opposing series so that when the axes of the windings and the Halbach array coincide, the induced voltage measured at the ends of this circuit approaches zero at this "null" position but increases exponentially with displacements of the axes. To complete the circuits and to accomplish one of the objectives of the invention, inductances are connected to complete the circuit of each of the quadrant pairs. By using dissimilar values in these two inductances, the radial stiffness of the stabilizer is made to be anisotropic. Anisotropy in radial stiffness is strongly stabilizing against so-called "whirl" instabilities of the rotor/bearing systems that can arise from mechanical hysteresis or displacement-dependent drag forces. Another new, objective of the present invention is accomplished by electronically monitoring the voltage output of each quadrant pair of windings. Any observed change in the ratio of these two voltages or in their waveform would signal a change in the balance of the rotor/bearing system, such as would occur as a result of a structural change in these components, for example, and internal rupture of fibers in a composite rotor. Such a signal would represent an early warning of a possibly major failure of the rotor system. This information could then be used to trigger a shutdown of the system before such a failure occurred.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

A Halbach array stabilizer and passive magnetic bearing system is described in U.S. Pat. No. 5,847,480, "Passive Magnetic Bearing Element with Minimal Power Losses." The present invention includes embodiments of a radial stabilizer that has advantages over the one disclosed in that patent and is particularly applicable for use in the passive magnetic bearing in a flywheel energy storage system. An aspect of the invention is that it suppresses rotor-dynamic instabilities by introducing anisotropic stiffness through circuit modifications of the stabilizer winding system. Another aspect of the invention is that it employs electrical signals from the modified windings to sense incipient failure modes of the flywheel rotor that result in a change in balance of the rotor. Thus, in addition to its role in stabilizing the passive bearing system against transverse displacements, the new stabilizer can help to stabilize so-called "whirl" instabilities of the rotor and, at the same time, detect changes in the balance of the rotor that could signal incipient mechanical failure of the rotor and/or elements attached to it.

Figure 1:
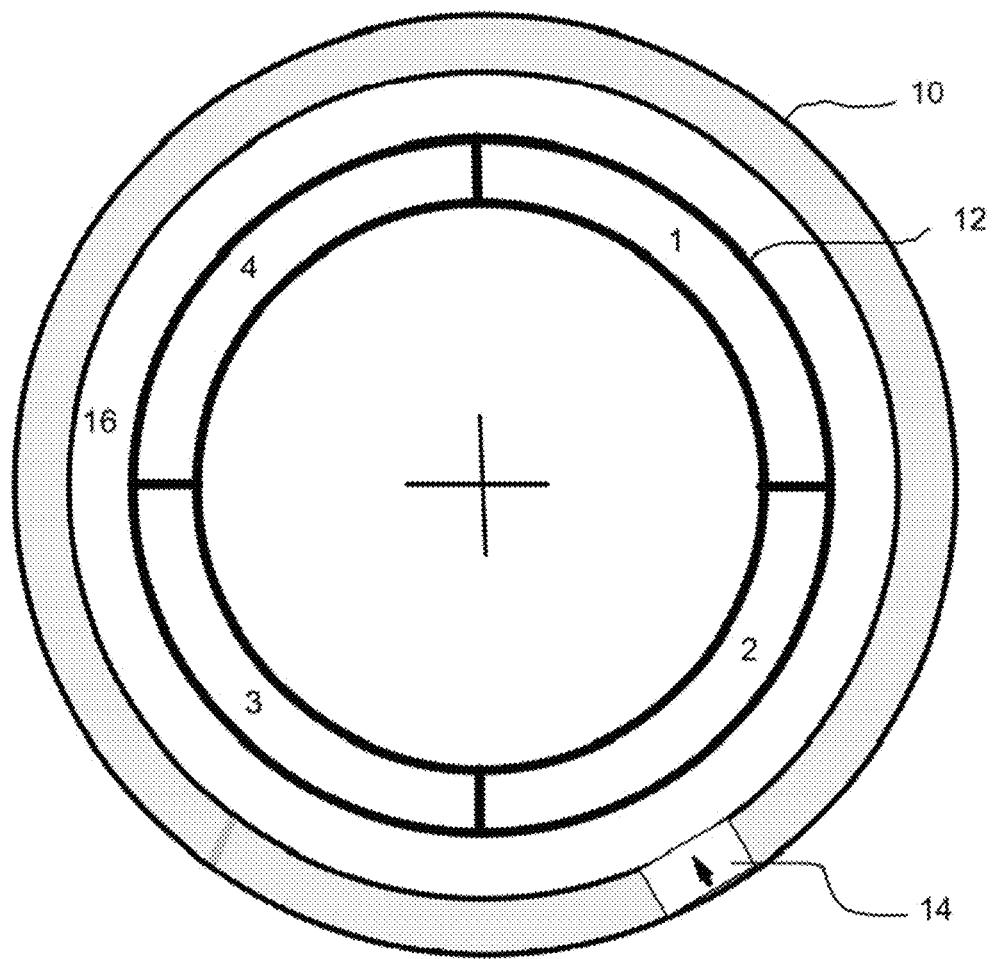
FIG. 1 is a schematic drawing of a radial stabilizer of the present invention and includes a view of the Halbach array and the quadrant winding support.

The geometry of the concept is shown schematically in FIG. 1. In top (or end) view there is shown the outermost cylindrical object, the Halbach array 10, which would be typically mounted on the inner surface of the rotor (not shown). The magnetic field from the Halbach array is concentrated near the inner surface of the array where it can interact strongly with the special windings that are located on the support 12 of the stabilizer. The support 12 is shown in the drawing as a cylindrical element with a slightly smaller radius than that of the inner surface of the Halbach array. Thus, there is a gap 16 between support 12 and Halbach array 10. Halbach arrays are known in the art and it is within the skill in the art to arrange the permanent magnets of the Halbach arrays to concentrate the magnetic field near the inner surface of the array. Only one permanent magnet 14 of such an array is shown in the figure. As can be seen in the drawing, the stabilizer is divided into four quadrant regions (1, 2, 3, 4), a division, as described below, that is employed in creating the afore-mentioned anisotropic radial stiffness of the stabilizer. In an alternate embodiment, the Halbach array is affixed to the inner support and its magnetic field is directed outward. In this alternate embodiment, the windings, in their respective quadrant, are located on the inner surface of the rotor which is configured to rotate around the relatively stationary Halbach array.

Figure 2:
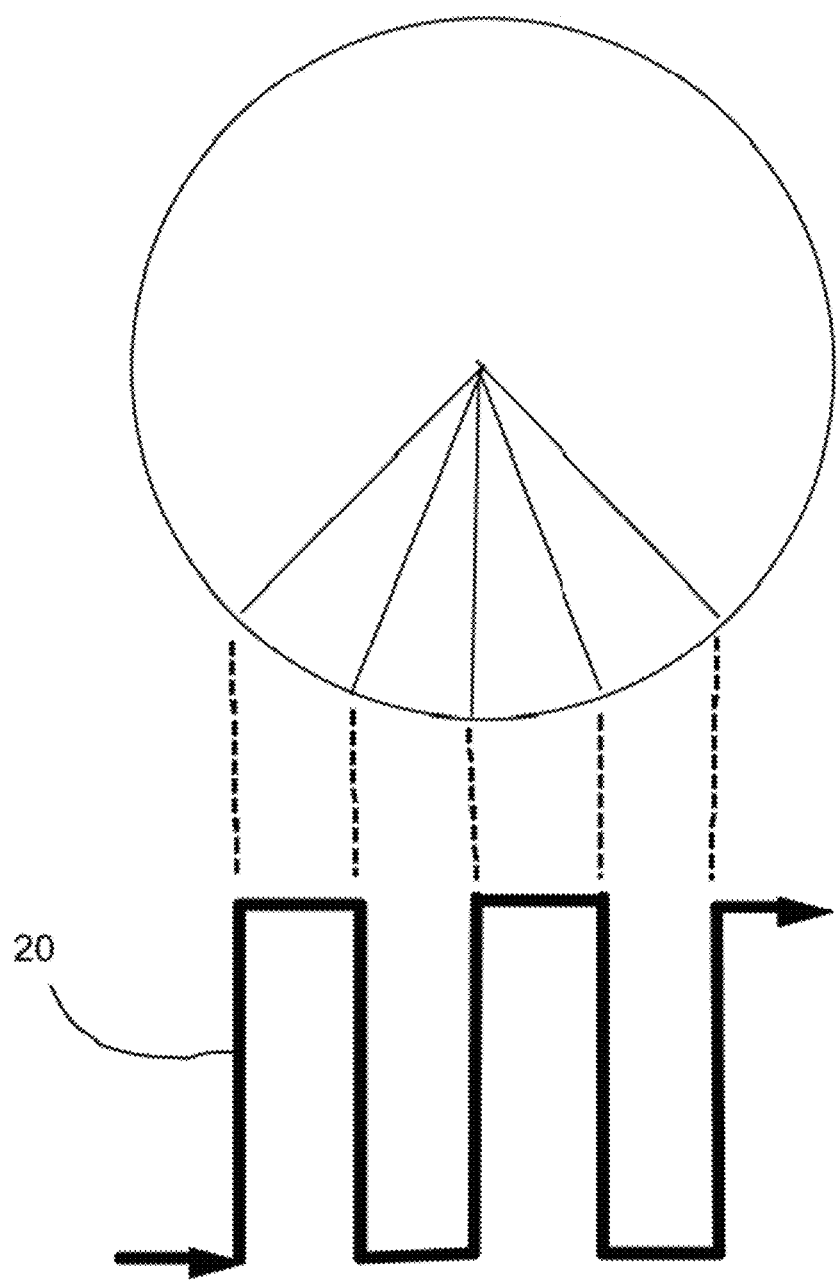
FIG. 2 is a schematic view of one quadrant winding and the geometry of the stabilizer winding support.

FIG. 2 is a schematic view of one of the quadrant windings referred above. As shown in the side view, the winding 20 is of a zig-zag shape, with a spacing between each leg congruent with a half-wavelength of the Halbach array. The ends of each quadrant winding are connected to conductors that exit the vacuum chamber through insulated bushings, for connection to external circuit elements to be described.

Each quadrant winding will generate an AC output voltage that will increase exponentially in magnitude with a radial displacement of the Halbach array relative to the stationary cylindrical element that supports the windings. On one side of the support structure 12, such radial displacement will narrow the gap between the winding of that quadrant and the Halbach array. The gap will correspondingly increase between the opposite quadrant and Halbach array. In the centered position of the Halbach array (relative to the axis of this cylinder), the output voltage of the quadrants that are located 180° from each other will be the same except for phase. Thus, if these opposite quadrant windings are then connected in opposing series, their output will approach zero when the Halbach array is centered with respect to the winding support cylinder. This output will then also increase exponentially from zero with lateral displacements of the Halbach array in the direction of either of these two opposite quadrants.

To control the current that flows in the electrically connected pairs of quadrant windings, an inductance is connected in series with the leads from each pair of the windings. These two inductances play an important role in the design. First, they control the net stiffness of the stabilizer and along with this they control the ohmic losses in the windings that occur upon transverse displacements. Second, by choosing different values for the two inductances, the stiffness of the stabilizer is made to be anisotropic. Anisotropic stiffness acts as a strong stabilizer against so-called "whirl instabilities" that can occur in bearing-supported rotating systems as a result of mechanical hysteresis within the rotating elements or mechanical moments generated by displacement-dependent drag forces.

Figure 3:
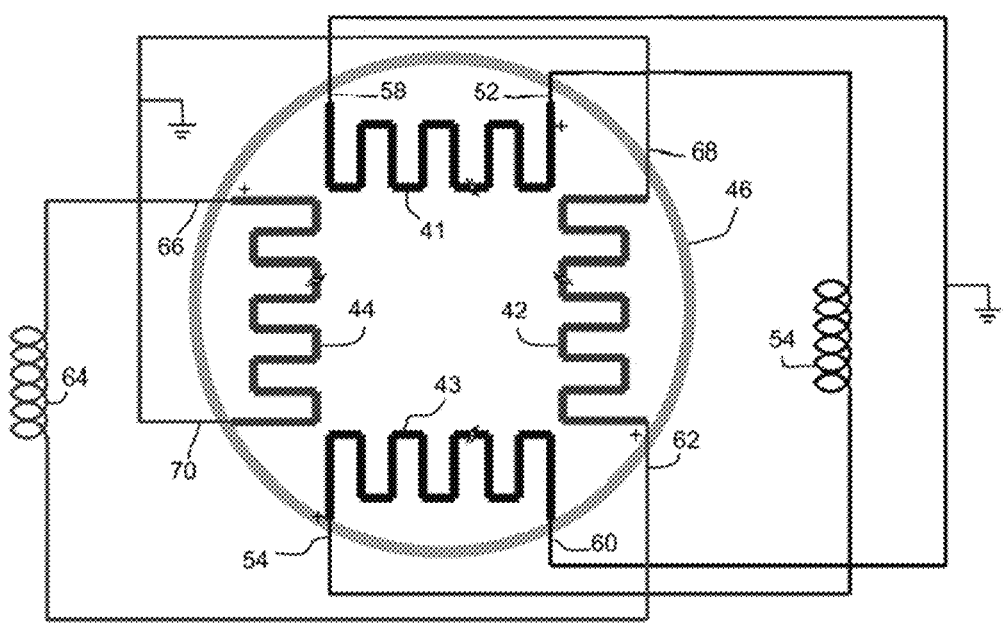
FIG. 3 shows an electrical connection schematic for the radial stabilizer windings of the present invention.

FIG. 3 is an electrical connection schematic for the present invention. Although the quadrant windings are shown as altogether forming a square, the windings in the present invention are formed on the circular outer wall of the support structure, and therefore curve around the circular outer wall. The windings are labeled 41 through 44. All of the windings are located within the vacuum vessel 46. Winding 41 has a positive lead 52 connected to an inductor 54, which is connected to positive lead 54 of winding 43. The negative leads 58 and 60 of winding 41 and 43, respectively, are connected together and can optionally be connected to ground. Winding 42 has a positive lead 62 connected to an inductor 64, which is connected to positive lead 66 connected to winding 44. The negative leads 68 and 70 of winding 42 and 44, respectively, are connected together and can be optionally be connected to ground. To achieve anisotropy, the values of inductors 54 and 64 are dissimilar. Note that the length of the winding segments can be set to accommodate any size stator. Thus, the larger the stator, then the larger are each of its quadrants and the length of the windings on each quadrant.

Independent of the stabilizing role of the quadrant windings in providing positive radial stiffness to overcome the negative stiffness of the levitation bearings, they can perform another, quite different and very important role. This role is to provide a means for continuously monitoring the state of balance of the rotor and thereby be able to sense any sudden change in balance associated with an incipient catastrophic failure of the rotor (or of any change in the rotor-dynamics of the system that would bring it closer to an instability threshold) in time to shut down the system before a major failure occurred. This sensing action would be implemented by connecting the output leads of the quadrant windings to an electronic circuit that would be able to signal any sudden change in the magnitude of the output of one or more of the windings, such as would occur as a result of any structural changes in the rotor due to small internal failures. Such a signal could therefore give an early warning of an incipient major failure.

Another technique is provided herein for stabilizing both the lateral type of whirl instability and a more recondite form of whirl instability "the tilt instability" that can arise as a result of gyroscopic nutation effects. The stabilizing effect on laterally directed whirling motion arises from a modification of the above described stabilizer to produce one which has anisotropic stiffness, that is, the positive stiffness (negative force derivative) of the stabilizer is caused to be greater for displacements in the, say, "x" direction than it is in the "y" direction, i.e., perpendicular to the former. For displacements that are purely transverse (i.e., no tilting motion) the equations that describe the forces on the center-of-gravity of the rotating object (in the absence of damping forces) are those given below:

$$M\frac{d^2x}{dt^2} = -K_1 x + \alpha_1 y$$

$$M\frac{d^2y}{dt^2} = -K_2 y - \alpha_2 x$$

Here $K_1$ and $K_2$ are the stiffness in the x and y direction, respectively, and $a_1$ and $a_2$ are the x and y-directed displacement-dependent, whirl producing, drag forces, from whatever source (i.e., from drags in the bearing system, or in the generator/motor (where relevant), or from internal mechanical hysteretic effects in the rotor.

Theoretical analysis of the solutions to the above equations yields a stability criterion which specifies a degree of stiffness anisotropy (nonequality of K1 and K2) sufficient to insure stability against lateral whirl. This criterion is:

$$\frac{K_1}{K_2} < \left[1 - \frac{2\sqrt{\alpha_1 \alpha_2}}{K_2}\right], K_1 < K_2, \text{Stable}$$

$$\text{or, } \frac{K_2}{K_1} < \left[1 - \frac{2\sqrt{\alpha_1 \alpha_2}}{K_1}\right], K_2 < K_1, \text{Stable}$$

If the drag force coefficients are small compared to the stiffness coefficients (i.e., a<<K, as is usually the case) the stiffness anisotropy required to stabilize transverse whirl is corresponding small.

Figure 4:
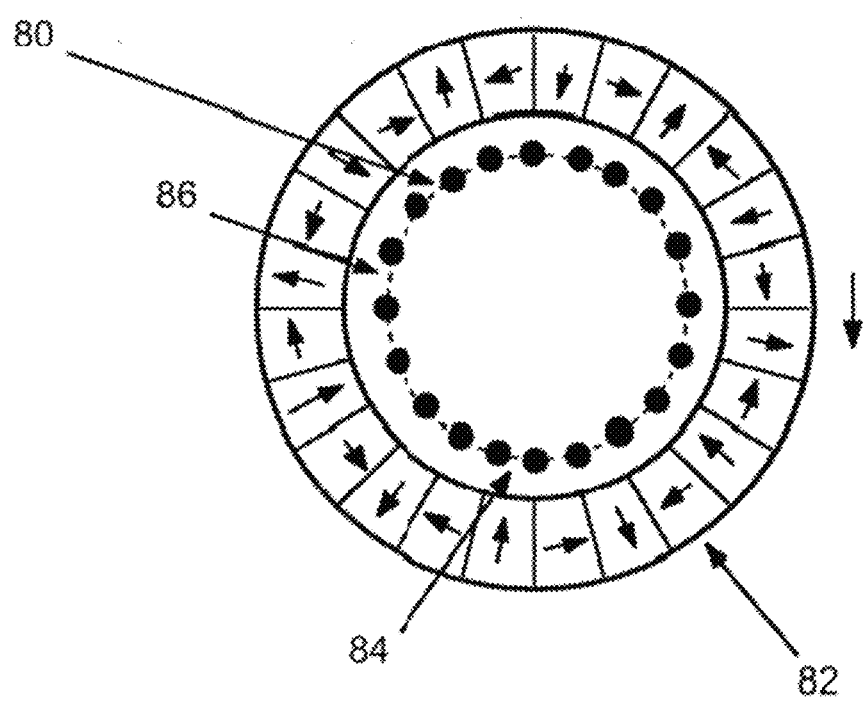
FIG. 4 shows a schematic drawing of an anisotropic stiffness radial stabilizer.

To accomplish the first end of the invention, i.e., stabilization against lateral whirl, it is proposed to modulate the spacing between inductive circuits azimuthally, i.e., to have the spacing between windings be minimum in the direction of one axis, say x, increasing to a wider spacing for plus or minus azimuthal changes that approach the y axis. This effect is shown (in exaggerated form) on the attached figure, for a case where the Halbach array rotates around the stationary windings. FIG. 4 shows a stationary circuit array 80 around which is located a rotatable Halbach array 82. Notice the narrower spacing between circuits at location 84 compared to the wider spacing at location 86.

An alternative embodiment (not shown) is one where the Halbach array is stationary and is located inside the (rotating) windings. In this case the azimuthal spacing of the windings would be uniform, but the azimuthal wavelength and/or intensity of the field of the Halbach array would be modulated by progressively varying the thickness of the magnet bars with azimuth. Variation of the thickness in the radial direction would modulate the strength of the field; modulation of the thickness in the azimuthal direction would vary the wavelength. In either case the modulation of the parameter is to be performed on the stationary element.

The above prescriptions would accomplish one objective of the invention, namely, stabilization of lateral whirl motions. The second objective of the invention, stabilization of tilt-whirl motion is accomplished by the choice of the geometry. Theory shows (analysis by T. K. Fowler, R. F. Post, and D. D. Ryutov) that if the drag force produced on the rotating element is produced by a stationary object outside of which there is a rotating element producing the drag force (here the residual drag produced by the rotating Halbach array of the first case, or the windings, of the second case), then with a proper adjustment of the parameters both the lateral and the tilt-type whirl can be stabilized.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
a cylinder having an outer wall characterized as having four quadrants and further having a central longitudinal axis;
a separate winding located on each quadrant, wherein each winding comprises a positive output, wherein the positive output of the windings located on geometrically opposite quadrants are connected together;
a rotor comprising an inner wall configured to rotate around said cylinder;
a Halbach array attached to the inner wall of said rotor and configured to concentrate its magnetic field near the inner surface of the array;
a first inductor coil connected between the positive output of a first set of windings located on geometrically opposite quadrants; and
a second inductor coil connected between the positive output of a second set of windings located on geometrically opposite quadrants, wherein an inductance of said first inductor coil is different from that of said second inductor coil.

2. The apparatus of claim 1, wherein when the rotor is rotating and a center of rotation of said rotor coincides with said central longitudinal axis, induced voltages between the connected windings approaches zero, and wherein when the rotor is rotating and a center of rotation of said rotor does not coincides with said central longitudinal axis, induced voltage between the connected windings increases exponentially with displacement of said center of rotation from said central longitudinal axis.

3. The apparatus of claim 1, wherein when the rotor is rotating and a center of rotation of said rotor coincides with said central longitudinal axis, induced voltages between the connected windings approaches zero, and wherein when the rotor is rotating and a center of rotation of said rotor does not coincides with said central longitudinal axis, induced voltage between the connected windings increases exponentially with displacement of said center of rotation from said central longitudinal axis.

4. The apparatus of claim 1, wherein each said separate winding comprises zig-zag pattern.

5. The apparatus of claim 4, wherein zig-zag pattern comprises a square wave pattern or a rectangular wave pattern.

6. The apparatus of claim 5, wherein a spacing between each leg of said pattern is congruent with a half-wavelength of said Halbach array.

7. An apparatus, comprising:
a cylinder having an outer wall and a central longitudinal axis, wherein said outer wall can be characterized as having four quadrants that altogether span the circumference of said outer wall such that a first quadrant is adjacent to a second quadrant which is adjacent to a third quadrant which is adjacent to a fourth quadrant which is adjacent to said first quadrant, wherein said first quadrant is on the opposite side of said axis from said third quadrant and wherein said second quadrant is on the opposite side of said axis from said fourth quadrant;
a first winding located on said first quadrant and not on the other quadrants, said first winding having a first negative lead and a first positive lead, wherein said first negative lead is grounded;
a second winding located on said second quadrant and not on the other quadrants, said second winding having a second negative lead and a second positive lead, wherein said second negative lead is grounded;
a third winding located on said third quadrant and not on the other quadrants, said third winding having a third negative lead and a third positive lead, wherein said third negative lead is grounded, wherein said first positive lead and said third positive lead are connected together;
a fourth winding located on said fourth quadrant and not on the other quadrants, said fourth winding having a fourth negative lead and a fourth positive lead, wherein said fourth negative lead is grounded, wherein said second positive lead and said fourth positive lead are connected together;
a rotor having an inner wall, wherein said rotor is configured to rotate around said cylinder;
a Halbach array attached to the inner wall of said rotor and configured to concentrate its magnetic field near the inner surface of the array
a first inductor coil having a first inductor lead and a second inductor lead; and
a second inductor coil having a third inductor lead and a fourth inductor lead, wherein said first positive lead is connected to said first inductor lead, wherein said second inductor lead is connected to said third positive lead, wherein said second positive lead is connected to said third inductor lead and wherein said fourth inductor lead is connected to said fourth positive lead, wherein an inductance of said first inductor coil is different from that of said second inductor coil.

8. The apparatus of claim 7, wherein said Halbach array is configured to concentrate its magnetic field near the inner surface of the array such that said magnetic field can interact with said first winding, said second winding, said third winding and said fourth winding, wherein when the rotor is rotating and the center of rotation of said rotor coincides with said central longitudinal axis, (i) the induced voltage between said first positive lead and said third positive lead approaches zero and (ii) the induced voltage between said second positive lead and said fourth positive lead approaches zero, and wherein when the rotor is rotating and the center of rotation of said rotor does not coincides with said central longitudinal axis, (i) the induced voltage between said first positive lead and said third positive lead increases exponentially with displacement of said center of rotation from said central longitudinal axis and (ii) the induced voltage between said second positive lead and said fourth positive lead increases exponentially with displacement of said center of rotation from said central longitudinal axis.

9. The apparatus of claim 7, wherein each of said first winding, said second winding, said third winding and said fourth winding comprises zig-zag pattern.

10. The apparatus of claim 9, wherein zig-zag pattern comprises a square wave pattern or a rectangular wave pattern.

11. The apparatus of claim 10, wherein a spacing between each leg is congruent with a half-wavelength of said Halbach array.

12. The apparatus of claim 7, wherein said first positive lead is adjacent to said second negative lead, wherein said second positive lead is adjacent to said third negative lead, wherein said third positive lead is adjacent to said fourth negative lead, wherein said fourth positive lead is adjacent to said first negative lead.

* * * * *